(12) United States Patent
Chilton

(10) Patent No.: US 6,477,618 B2
(45) Date of Patent: Nov. 5, 2002

(54) DATA STORAGE SYSTEM CLUSTER ARCHITECTURE

(75) Inventor: Kendell Chilton, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 123 days.

(21) Appl. No.: 09/751,494

(22) Filed: Dec. 28, 2000

(65) Prior Publication Data

US 2002/0124134 A1 Sep. 5, 2002

(51) Int. Cl.[7] .......................... G06F 12/00; G11B 17/22
(52) U.S. Cl. ................... 711/113; 711/111; 711/114; 709/201
(58) Field of Search ............................. 711/100, 111, 711/112, 113, 114, 154; 709/201, 220, 223

(56) References Cited

U.S. PATENT DOCUMENTS

| | | | | |
|---|---|---|---|---|
| 5,737,747 A | * | 4/1998 | Vishlitzky et al. | 711/118 |
| 5,829,046 A | * | 10/1998 | Tzelnic et al. | 711/162 |
| 5,890,207 A | * | 3/1999 | Sne et al. | 711/113 |
| 5,890,219 A | * | 3/1999 | Scaringella et al. | 711/162 |
| 5,913,227 A | * | 6/1999 | Raz et al. | 711/152 |
| 5,944,789 A | * | 8/1999 | Tzelnic et al. | 709/214 |
| 6,317,805 B1 | * | 11/2001 | Chilton et al. | 710/129 |

* cited by examiner

Primary Examiner—Tuan V. Thai
(74) Attorney, Agent, or Firm—John M. Gunther, Esq.; Krishnendu Gupta, Esq.

(57) ABSTRACT

A storage cluster includes integrated cached disk arrays (ICDAs) and cluster interconnect such as a set of Fiber Channel links. Selected ICDAs include data storage disks collectively configured as cluster volumes. A switch network in each ICDA provides connections between the cluster interconnect and host interfaces, disk interfaces, and memory modules that may reside in the ICDA. Upon receiving a request, an ICDA determines whether the target disk resides in another ICDA, and if so forwards the request to the other ICDA via the cluster interconnect. The other ICDA services the request and returns a completion indication, which is forwarded to the host. Requests may also flow from the second ICDA to the first ICDA. The ICDAs may also include memory for data caching. The switch network preferably has a common interface to the different functional elements (host interfaces, disk interfaces, memory modules) for greater flexibility in configuring each ICDA.

13 Claims, 5 Drawing Sheets

| CLUSTER VOLUME # | LOCATION |
|---|---|
| 1<br>2<br>⋮<br>$N_1$ | ICDA #1 |
| $N_1+1$<br>$N_1+2$<br>⋮<br>$N_2$ | ICDA #2 |
| $N_2+1$<br>$N_2+2$<br>⋮<br>$N_3$ | ICDA #3 |
| ⋮<br>$N_4$ | ICDA #4 |
| ⋮<br>$N_C$ | ICDA #5 |
FIG. 6
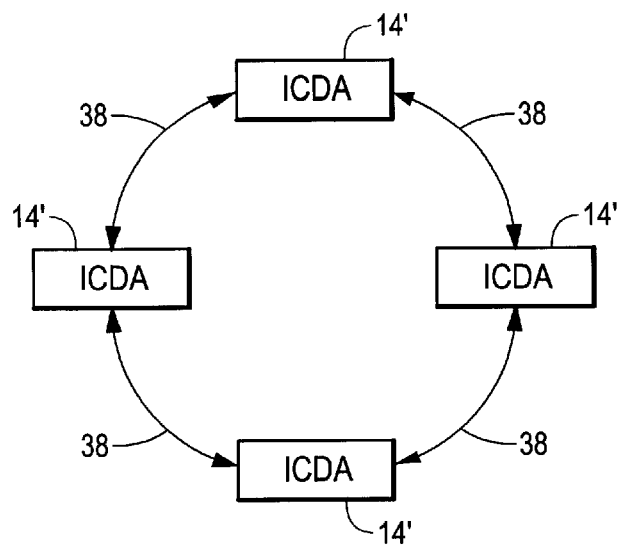
FIG. 7
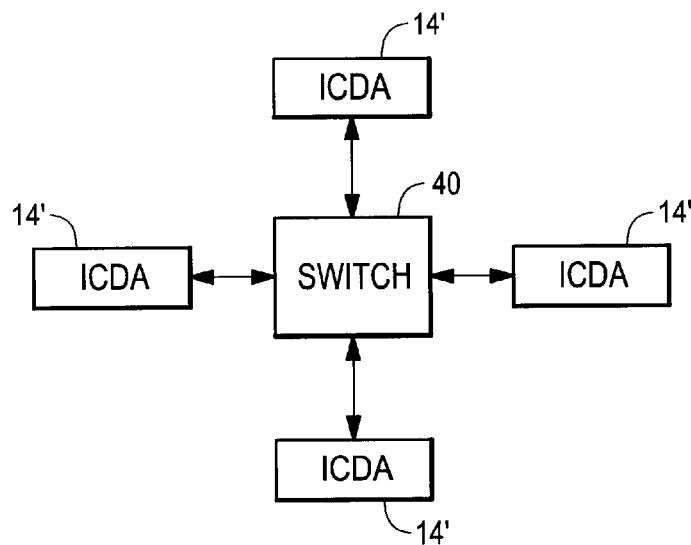
FIG. 8

DATA STORAGE SYSTEM CLUSTER ARCHITECTURE

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of computer data storage systems.

Devices known as integrated cached disk arrays (ICDAs) have been used for high-capacity data storage in computer systems. ICDAs typically include a number of disks and associated disk interfaces, a number of interfaces to host computers in the computer system, memory for implementing a data cache between the disks and the hosts so as to reduce overall data access times and therefore enhance system performance, and interconnections among the disk interfaces, host interfaces, and memory to provide paths for data transfers.

Although a typical ICDA has a very large maximum storage capacity, there are nonetheless applications in which more storage than that provided by a single ICDA is required. It has been known to attach multiple ICDAs and other devices to a specialized network termed a "storage area network" or SAN. Host computers connected to the SAN potentially have access to all the storage residing on the ICDAs of the SAN. The use of a SAN therefore provides a degree of "scalability", or the ability to add storage to a computer system incrementally. Nevertheless, each ICDA in such a case must include all the functionality required to store data and transfer stored data to and from the SAN. Thus, SAN-based scaling of storage capacity includes expanding overhead functionality that may result in sub-optimal system storage densities, costs, or other important characteristics.

Additionally, the volumetric storage density of rotating media such as magnetic disks continues to grow at a rate substantially greater than the density growth rate of semiconductor memory and logic. Existing ICDAs have been designed to meet a range of system needs based on the present relationship between the density of magnetic media and that of semiconductor memory. In particular, an ICDA may have a maximum number of host interfaces that is suitable for its present maximum disk storage capacity. However, over time it may be desirable to increase the number of host interfaces per unit of disk storage on a SAN, or to increase the amount of memory per unit of disk storage. With present ICDAs, it may be difficult or impossible to achieve the desired ratios for sufficiently large data sets.

It is desirable, therefore, to provide for greater flexibility in configuring data storage systems employing ICDAs, so as to achieve desired system performance while optimizing any necessary tradeoffs between cost, space, and other important characteristics of a storage system.

BRIEF SUMMARY OF THE INVENTION

In accordance with the present invention, a storage system cluster architecture is disclosed that provides improved performance over previous systems, and enhanced flexibility so as to be adaptable for use in many different applications.

A storage system employing the disclosed cluster architecture includes multiple integrated cached disk arrays (ICDAs), wherein selected ICDAs include respective sets of data storage disks that are collectively configured as a set of separately-addressable cluster volumes. A cluster interconnection network such as a set of Fiber Channel links connects the ICDAs of the cluster together. Each ICDA includes a switch network that provides dynamic connections between the cluster interconnection network and functional elements within the ICDA, such as host interfaces, disk interfaces, and memory modules that are used for caching of disk data.

At least one ICDA in the cluster includes one or more host interfaces at which host data storage requests are received. In response to receiving a request from a host, this ICDA determines whether the target disk for the request resides within another ICDA in the cluster. If so, the host request is forwarded to the second ICDA via the cluster interconnection network for servicing. The second ICDA includes one or more disk interfaces respectively interfacing to disks within the second ICDA. The second ICDA receives the forwarded host request from the first ICDA via the cluster interconnection network, services the request via the disk interface coupled to the target disk, and returns an indication to the first ICDA that the host request has been serviced. Upon receiving this indication, the first ICDA returns an indication to the requesting host that the request has been serviced. In the case of reads, of course, the indication of completion is the return of the requested read data. For writes, the indication may take the form of a "write complete" message that frees the host to proceed with other processing.

The cluster approach unburdens hosts from physical details of the distribution of disk volumes among a number of ICDAs. From the perspective of each host, all the cluster volumes appear to reside on the ICDA to which the host is attached. This architecture also provides for smooth upgrading of storage systems, by providing much greater flexibility in the distribution of resources. It is possible, for example, to add additional disk capacity to a cluster by adding an ICDA that contains only disks and disk interfaces, whereas in prior systems it was necessary that each ICDA include host interfaces as well in order to provide the necessary connectivity to the existing hosts.

The different ICDAs may incorporate additional features that enable other host requests to flow from the second ICDA to the first ICDA, for example. The ICDAs may also include memory that can be used for caching of data associated with the requests. To provide for even greater flexibility, the switch network has a common interface to different types of functional elements such as the host interfaces, the disk interfaces, and the memory, so that a wide variety of configurations of these elements can be employed in any given ICDA. ICDAs can be configured as special purpose units in a cluster, such as units that contain primarily disks, or as more general purpose units that cooperate as multi-function peers with other ICDAs in the cluster.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which:

FIG. 6 is a table showing a mapping between cluster volumes and individual ICDAs in the storage system of FIG. 4; and FIGS. 7 and 8 are block diagrams of a storage systems employing ring and switch topologies respectively.

DETAILED DESCRIPTION OF THE INVENTION

Figure 1:
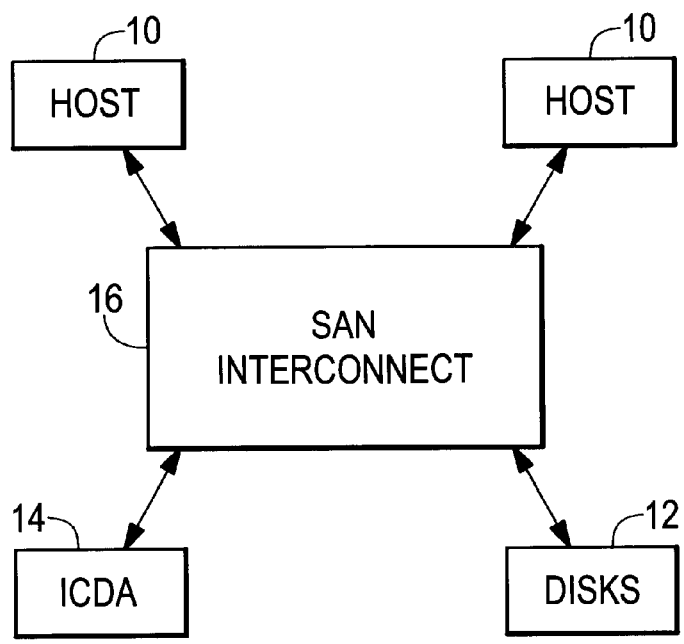
FIG. 1 is a block diagram of a prior art storage area network system including an integrated cached disk arrays (ICDA)

FIG. 1 shows a general structure for a storage area network (SAN). A number of hosts 10, such as server. computers, are connected to one or more sets of storage disks 12 and one or more integrated cached disk arrays (ICDAs) 14 by SAN interconnect 16. Each set of disks 12 may include, for example, a controller and a number of head disk assemblies (HDAs) that are interconnected by a bus such as a Small Computer System Interconnect (SCSI) bus (not shown in FIG. 1). As described below, each ICDA 14 generally includes similar components, (i.e., controller/ disks/bus sets) along with a large semiconductor memory array and additional controllers used to provide caching of disk data and related functions. At present, the SAN interconnect 16 may be realized as a collection of optical communications links such as Fiber Channel links, along with associated equipment such as switches (not shown in FIG. 1) that collectively form a high-capacity multi-point data network for carrying storage traffic.

A SAN has a number of useful features that enhance storage-related aspects of system performance, notably the ability to scale the system by adding more ICDAs 14 and/or more hosts 10. In the first case, the total storage capacity available to the hosts 10 in the SAN is increased, while in the second case the number of hosts 10 having access to the total storage capacity of the SAN is increased. Nevertheless, as described above there are limitations on the utilization of these resources that prevent systems from achieving more optimal cost/performance characteristics.

Figure 2:
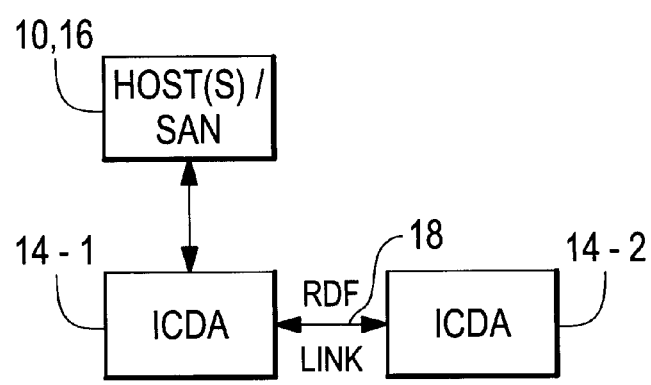
FIG. 2 is a block diagram of a prior art storage system employing two ICDAs connected by a remote data facility (RDF) link.

FIG. 2 shows how the prior art ICDAs 14 can also be used in a configuration to enhance data protection. A first ICDA 14-1 is connected to a SAN and/or has direct connections to one or more hosts 10. The ICDA 14-1 also has a remote data facility (RDF) link 18 to a second ICDA 14-2. In this configuration, the ICDAs 14-1 and 14-2 carry out certain data transfers via the RDF link 18 to maintain a copy of data stored on the first ICDA 14-1 on the second ICDA 14-2. This configuration can be used in a variety of ways. According a "shadowing" technique, second ICDA 14-2 has an exact copy of the data on the first ICDA 14-2 at each instant. Alternatively, it may be desirable to obtain "snapshots" of the data on the first ICDA 14-1 at specified intervals and store these snapshots on the second ICDA 14-2 for any of various purposes. In each of these applications, the fundamental operation is that of replicating data stored on the first ICDA 14-1 on the second ICDA 14-2. The second ICDA 14-2 is not available to the host(s) 10 or SAN as an independent unit of storage capacity.

Figure 3:
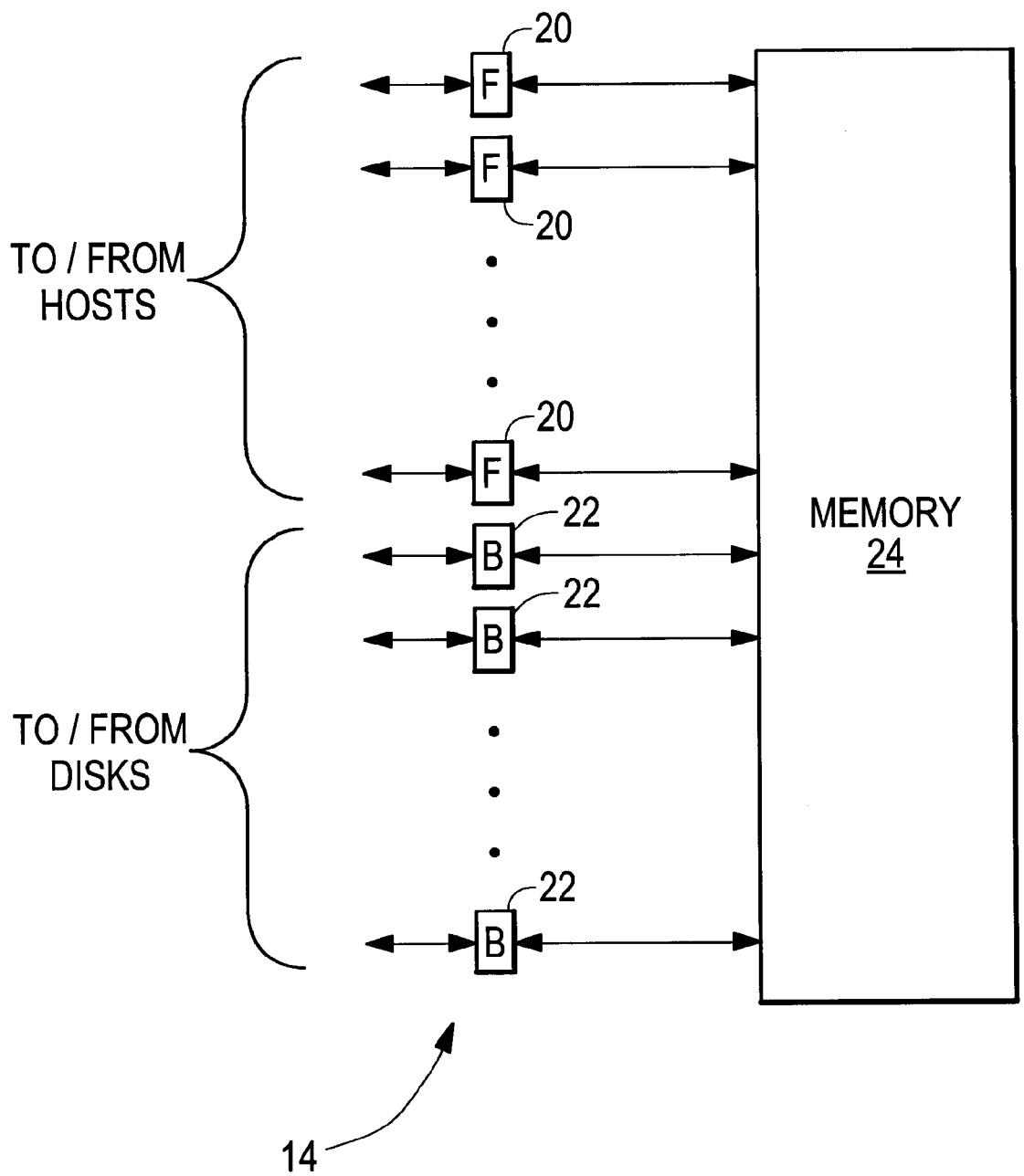
FIG. 3 is a block diagram of a prior art ICDA such as used in the systems of FIGS. 2 and 3.

FIG. 3 shows the general structure of an ICDA 14 apart from its internal array of disks. The hosts 10 and/or SANs are connected to front-end director modules (F) 20, and the internal disks of the ICDA 14 are connected to back-end director modules (B) 22. The director modules 20 and 22 are connected to a memory 24. The primary use of the memory 24 is disk data caching, wherein data that has recently been read from the disks or written by the hosts is temporarily stored in the memory 24. In the case of reads, the data for subsequent host read requests is obtained from the memory 24 rather than from a disk, resulting in significantly faster read completion times. Similarly, write requests are satisfied by initially writing the data into the memory 24 rather than to a disk. The host is allowed to continue in its processing stream, and the writes are completed to the disks later as a "background" process. Hardware and software mechanisms within the ICDA 14 are responsible for managing the data that flows through the memory 24 to satisfy several criteria, such as maintaining a coherent view of the data for the various hosts, utilizing storage space in the memory 24 efficiently, minimizing read and write delays, error handling, etc.

Although not shown in FIG. 3, the memory 24 is generally implemented as a collection of discrete memory modules, enabling flexible configuration of the ICDA 14 for different applications requiring different amounts of memory for desired performance. The director modules 20 and 22 are also discrete units that can be added or subtracted to achieve different system configurations while minimizing costs. Additionally, it is desirable to provide for redundant paths from each host 10 or SAN 16 to the various disks within each ICDA 14 to enhance system availability. It may be desired to connect each host 10 or SAN interconnect 16, for example, to multiple front-end directors 20, either of which can carry all of the data traffic if the other should fail. There may be redundant memory elements within the memory 24, and multiple paths between each director module 20, 22 and each set of such memory elements. Such redundancy can be achieved in any of a variety of ways.

Some of the above-mentioned drawbacks of the prior art are described more specifically with reference to FIGS. 1–3. While the SAN and the ICDA 14 both exhibit a degree of scalability that provides for some flexibility in tailoring a storage system to a variety of user needs, certain aspects of this architecture impose undesirable constraints on flexibility and therefore constraints on the range of cost/ performance tradeoffs that can be made by a user. One significant constraint is the memory 24 in each ICDA. The volumetric storage density of semiconductor memory is growing at a much lower rate than that of rotating storage devices such as magnetic disks. Accordingly, the maximum storage capacity of the memory 24 within an ICDA 14 may become inadequate as the storage capacity of the disks in the ICDA 14 grows over time. A similar constraint is the number of data access "ports" provided by the front-end directors 20, which likewise may become inadequate to meet system needs as more and more data is concentrated within a given ICDA 14. Another problem can arise when the desired overall storage capacity in a system is slightly greater than that provided by a single ICDA 14. In this case, each host 10 or SAN 16 having access to the data is burdened with a separate interface to an additional ICDA 14, increasing the costs associated with the system hardware.

Figure 4:
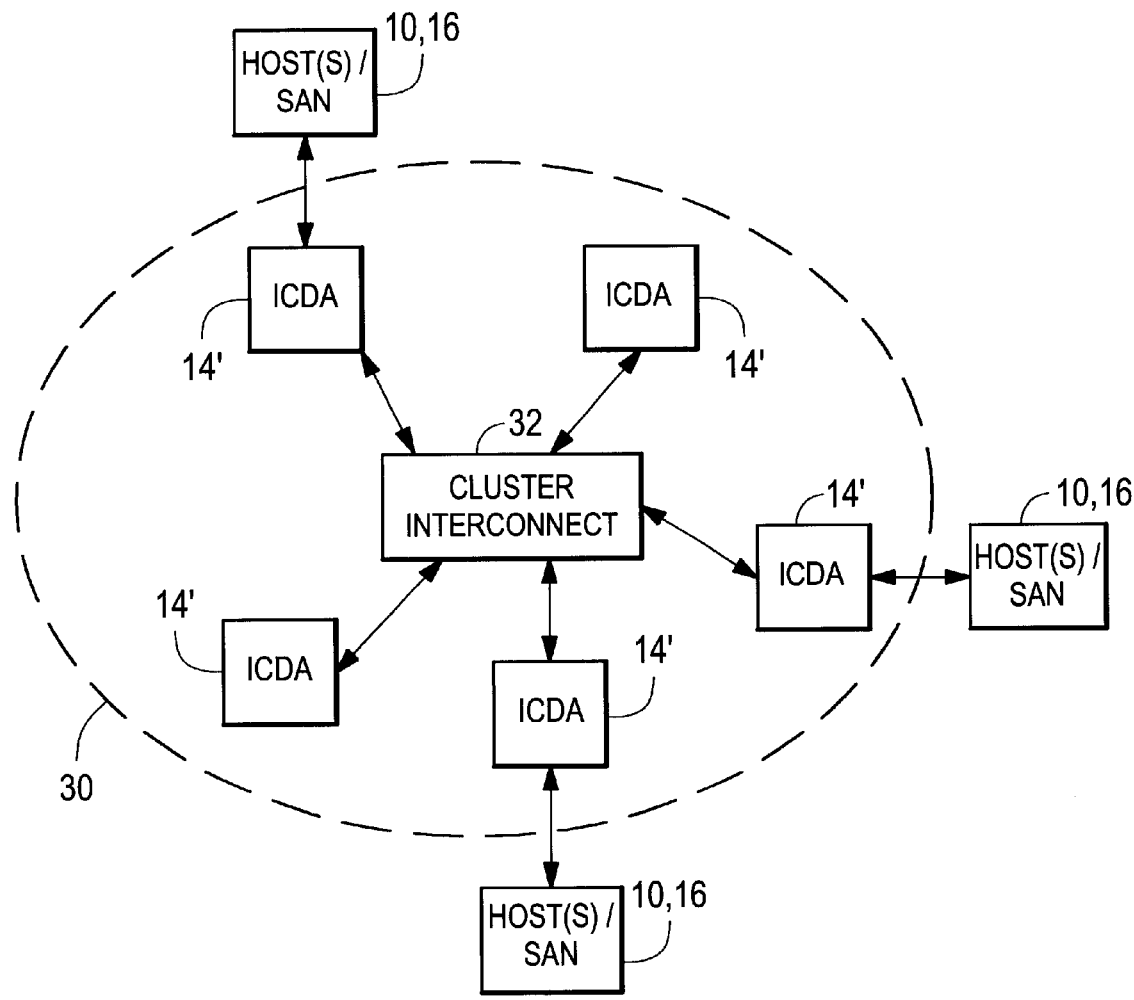
FIG. 4 is a generalized block diagram of a storage system employing a cluster architecture in accordance with the present invention.

FIG. 4 shows a storage system that overcomes such drawbacks of prior storage systems. In the system of FIG. 4, the host(s) 10 and/or SANs have respective interfaces to a storage cluster 30, which includes a number of ICDAs 14' and cluster interconnect 32. Within the cluster 30, some ICDAs 14' provide connections to hosts 10 or SANs 16 in addition to resources such as disk storage space and/or semiconductor memory. Other ICDAs 14' may be used only to provide additional storage, and do not have separate interfaces to hosts 10 or SANs 16. At those ICDAs 14' having host/SAN interfaces, these interfaces can be similar to or the same as the interfaces to the host(s) 10 or SAN in FIGS. 1 and 2. In particular, both the ICDAs 14 and the ICDAs 14' are responding devices on these interfaces, responding to read and write operations initiated by the hosts 10.

The ICDAs 14' also include one or more interfaces to the cluster interconnect 32 to carry out communications and data transfer with other ICDAs 14' connected thereto. At the lowest hardware operating level, the cluster interconnect 32 may employ Fiber Channel or similar communications interface components and protocols. However, as described below, the higher-level operating features of the cluster interconnect 32 and associated functionality of the ICDAs 14' provide novel system-level features to address the drawbacks of the prior art previously described.

Figure 5:
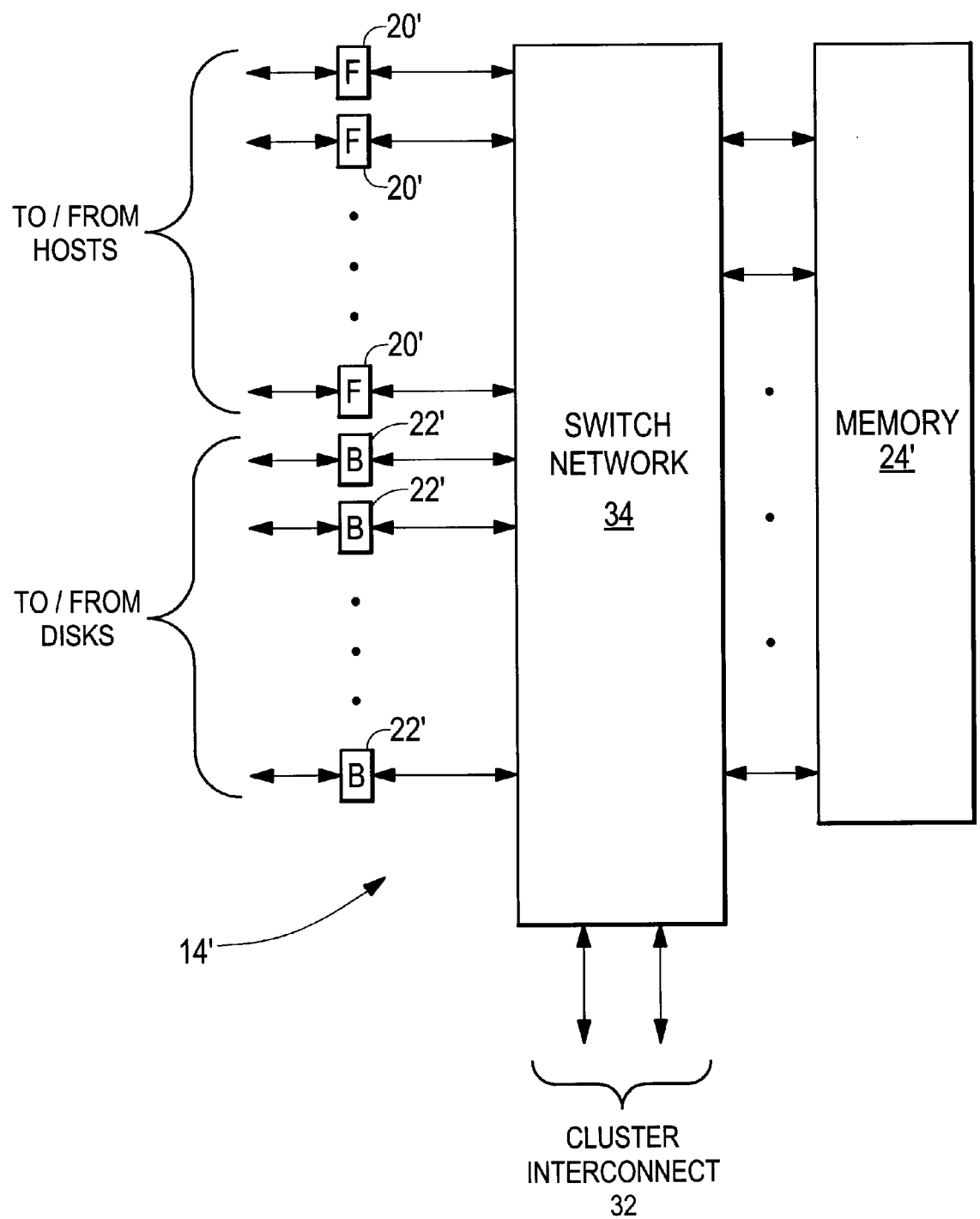
FIG. 5 is a block diagram of an ICDA in accordance with the present invention for use in the storage system of FIG. 4.

FIG. 5 shows the general structure of an ICDA 14', apart from its internal array of disks, as used in the system of FIG. 4. The hosts 10 and/or SANs are connected to front-end director modules (F) 20', and the internal disks are connected to back-end director modules (B) 22'. The director modules 20' and 22' are connected to a switch network 34, which also has connections to a memory 24'. The switch network 34 also connects to the cluster interconnect 32.

In general, the switch network 34 is responsible for establishing connections among the participants in data transfers. When a front-end director 20' receives a request from a host 10, for example, it determines what the target of the request is, i.e., the memory 24', a back-end director 22', or the cluster interconnect 32, and directs the switch network 34 to establish the desired connection. The request, and the associated data in the case of a write, are transferred to the target. In the case of read transactions that can be satisfied from the memory 24', the connection is maintained until the desired read data has been returned to the requester. For disk reads, this first connection is broken after the request is transferred to the disk, and a new connection is established upon request of a back-end director 22' when the data has been received from the disk and is to be returned to the requesting front-end director 20'.

Although in FIG. 5 the internal connection fabric within the ICDA 141 is shown as a switch network 34, the connection fabric can be realized in different ways, for example as one or more shared buses. In general, the data transfer protocol used within the ICDA 14' may be different from that on the cluster interconnect 32, so that translation logic (not shown) is generally required to convert between the respective protocols of the internal connection fabric and the cluster interconnect 32.

FIG. 6 illustrates one important feature of the cluster 30. From the perspective of each host 10 or SAN 16, there is a collection of disks or "volumes" that are accessible via the ICDA 14' to which the host 10 or SAN 16 is connected. Logically, the collection of volumes in the cluster 30 might be considered as an array, with the volumes being numbered from 1 to $N_c$ as shown. For example, there may be 500 volumes in the cluster 30, in which case each host 10 or SAN 16 sees an array of volumes numbered from 1 to $N_c$=500.

Within the cluster 30, however, the volumes physically reside on the different ICDAs 14'. In the exemplary system of FIG. 4, for example, there are five ICDAs 14'. In general, the ICDAs 14' contain different numbers of volumes. Continuing with the above example, let it be assumed that one ICDA 14' contains 90 volumes, a second 130, a third 80, a fourth 120, and a fifth 80. In this case, these 500 logical volumes may be mapped to the physical volumes as follows:

| | |
|---|---|
| 1–90 | ICDA #1 |
| 91–220 | ICDA #2 |
| 221–300 | ICDA #3 |
| 301–420 | ICDA #4 |
| 421–500 | ICDA #5 |

In operation, each ICDA 14' that receives a host data request is responsible for determining which ICDA 14' contains the cluster volume or volumes involved in the request. Requests that involve only local volumes are processed locally. For requests that involve volumes on one or more other ICDAs 14', the request is forwarded to the appropriate ICDA(s) 14' via the cluster interconnect 32. Each receiving ICDA 14' is then responsible for performing its part of the request, which generally includes either reading or writing disk data. In the case of reads, the data is returned to the original ICDA 14', which in turn returns the data to the requesting host.

FIG. 4 illustrates one significant advantage of the cluster architecture over the architecture of FIG. 1. Even though a cluster 30 includes multiple ICDAs 14' and their collective attributes, each host 10 and/or SAN 16 need be connected to the cluster 30 at only one point. There is improved flexibility in the manner in which a number of hosts 10 or SANs 16 access a multi-volume data set, without a negative effect on the hardware configurations or costs of the hosts 10 or SANs 16. Stated differently, the number of host or SAN ports per unit of storage has a significantly wider range of possible values, so that better cost/performance tradeoffs can be made for different applications.

There are additional advantages as well. Using the cluster architecture of FIG. 4, systems can be configured in ways that are not even possible in the prior art systems. Each ICDA 14' can be tailored to provide specific functionality in the overall cluster 30 without the need for corresponding overhead. For example, certain ICDAs 141 may contain only disk storage that is made available to the other ICDAs 14' in the cluster. Such an ICDA 14' need not be configured with front-end directors 20' or even with memory 24'; the connectivity and caching functions associated with those components can be performed in those ICDAs 14' having connections to hosts 10 and/or SANs 16. In fact, it may be desirable that one or more of the ICDAs 14' having host/SAN connections have no disks or back-end directors 22' at all. If the design of these ICDAs 14' permits, the space saved by removing the disks and back-end directors 221 can be used to increase the number front-end directors 20' and/or the size of the memory 24'. Given the growing disparity between the volumetric storage capacity of semiconductor memory and magnetic disks, it may be useful to dedicate one or more such ICDAs 14' at each connection point to the cluster 30, and utilize a smaller number of ICDAs 14' within the cluster 30 to provide the desired disk storage. Such an arrangement can be made possible, for example, by using a common interface between the switch 34 and the various components 20', 22' and 24' within the ICDAs 14' as described below.

As with the prior art ICDA 14 described above, it may be useful to incorporate redundancy features in the ICDA 14' to enhance system availability. These may include connecting each host to two front-end director modules 20', and connecting each disk to two back-end director modules 22'. In this way, each host and disk has two independent paths to the switch network 34. Additional redundancy can be achieved within the switch network 34. For example, the switch network 34 can be implemented as two separate switching sub-networks arranged in parallel, with each director module 20', 22' and the memory 24' having connections to both of the separate switching sub-networks. In the event of a failure in part or all of one of the sub-networks, data traffic can be routed through the other sub-network. It would also be desirable that each such switching sub-network have a separate interface to the cluster interconnect 32, to permit inter-ICDA transfers to continue.

Each director module 20', 22' and the memory 24' preferably has multiple independent connections, or "ports", to the switch network 34. This arrangement provides for greater parallelism by enabling a single director 20', 22' to be engaged in multiple simultaneous data transfers. At any time, the switch network 34 provides the necessary connectivity among all the participants in respective data transfers. For transfers involving the disk data cache, connections are formed between participating director modules 20', 22' and participating portions of the memory 24'. The switch network 34 may also have the ability to create connections directly between a front-end director 20' and a back-end director module 22' for certain types of transfers, bypassing the memory 24' altogether. So-called "streaming media" services, such as video delivery services, are good examples of such applications. There may be other applications in which some degree of data caching is used, but the caching is carried out by the hosts 10 using their own memory systems. Such host-based caching fundamentally alters the nature of the requests serviced by the ICDA 14', such that overall system performance may be better if the ICDA 14' performs no caching at all.

Additionally, it may be advantageous for the switch network 34 to be capable of providing direct connections between two or more separate modules (not shown) of the memory 24' itself. In general, such functionality may be desired when a host request requires the involvement of multiple memory modules. Such requirements arise, for example, when certain configurations of RAID (Redundant Array of Independent Disks) are employed. When a protection scheme referred to as RAID-5 is employed, it is necessary to calculate parity on a block of data that is written to a disk, and store the calculated parity on a separate disk. To support RAID-5, it may be convenient to include parity-calculating circuitry on one memory module to accumulate a parity calculation as a data block is written to the memory 24'. Upon completion of this write, the memory module on which the parity-calculating circuitry resides can perform a direct transfer to another memory module which is associated with the RAID-5 parity disk. During a read of disk data, the required parity checking can proceed in generally the reverse order, beginning with a transfer from a parity memory module to the memory module containing the user data block.

It is preferable that the directors 20', 22' and the individual modules (not shown) of the memory 24' have substantially similar interfaces to the switch network 34. When this is the case, there is greater flexibility in configuring each ICDA 14' for the particular needs of each cluster-based system. The proportion of front-end directors 20' to back-end directors 22' can be varied as desired, as can the proportion of memory 24'. Different ICDAs 14' in the cluster 30 (FIG. 4) can provide specialized functionality. For example, it may be desirable to configure one ICDA 14' with a maximum number of disks and back-end directors 22', receiving all requests from other ICDAs 14' via the cluster interconnect 32. One or more other ICDAs 14' in such a cluster may provide mostly front-end connectivity (i.e., connections for hosts 10 and/or SANs 16) with or without memory 24' for caching. These ICDAs 14' would forward host requests via the cluster interconnect 32 to the ICDA(s) 14' in which the disk storage is concentrated.

The cluster architecture also provides for smoother upgrading of storage systems. A system having one ICDA 14', for example, can have disk capacity added by introducing a second ICDA 14' and interconnecting the two ICDAs 14' by the cluster interconnect 32. From the perspective of the attached hosts, it appears that more volumes have simply been added to the existing ICDA 14' There is no need for any configuring of the hosts beyond that required to make use of the additional volumes.

FIGS. 6 and 7 show examples of topologies that can be used for the cluster interconnect 32. FIG. 6 shows a ring topology, in which each ICDA 14' has links 38 to two nearest neighbors in the ring. In FIG. 7, the ICDAs 14' are interconnected by a central switch 40. Other topologies are possible.

While the ICDAs 14' have been described as separate physical entities that may be separated by substantial distance, it may be desirable in alternative embodiments to package one or more ICDAs 14' in a common housing. This technique can be used, for example, when it is desired to place numerous director modules 20', 22' and/or modules of memory 24' within a single cabinet without requiring a larger switch network 34. Rather, multiple switch networks 34 can be used, each with an associated group of the modules, and the switch networks 34 can be interconnected via the cluster interconnect 32.

A data storage system cluster architecture has been described. It will be apparent to those skilled in the art that modifications to and variations of the disclosed clustering techniques are possible without departing from the inventive concepts disclosed herein, and therefore the invention should not be viewed as limited except to the full scope and spirit of the appended claims.

What is claimed is:

1. A data storage cluster, comprising:
   a plurality of integrated cached disk arrays (ICDAs), selected ICDAs including respective pluralities of data storage disks, the disks of the selected ICDAs being collectively configured as a set of separately-addressable cluster volumes; and
   a cluster interconnection network connecting the ICDAs of the cluster together;
   wherein:
   a first ICDA in the cluster includes one or more host interfaces at which host data storage requests are received, the first ICDA being operative to (i) determine whether a target disk for a received host request resides within a second ICDA in the cluster, (ii) if the target disk resides within the second ICDA, forward the host request via the cluster interconnection network to the second ICDA for servicing, and (iii)

upon receiving an indication from the second ICDA that the request has been serviced, return an indication to the requesting host that the request has been serviced; and the second ICDA includes one or more disk interfaces respectively interfacing to disks within the second ICDA, the second ICDA being operative to (i) receive the host request from the first ICDA via the cluster interconnection network, (ii) service the received host request via the disk interface coupled to the target disk, and (iii) return an indication to the first ICDA that the host request has been serviced.

2. A data storage cluster according to claim 1, wherein the first ICDA further includes one or more disk interfaces respectively interfacing to disks within the first ICDA, and wherein the first ICDA is operative to (i) determine whether the target disk resides within the first ICDA, and (ii) service the request if the target disk resides within the first ICDA.

3. A data storage cluster according to claim 1, wherein the first ICDA further includes memory modules containing a cache for data residing on the target disk other than the data involved in the host request, and wherein the first ICDA is further operative to service a subsequent host request using the cache rather than forwarding the request to the second ICDA for servicing.

4. A data storage cluster according to claim 3, wherein the first ICDA further includes one or more disk interfaces respectively interfacing to disks within the first ICDA, and wherein the first ICDA is operative to (i) determine whether a target disk for a subsequent host request resides within the first ICDA, and (ii) service the request if the target disk for the subsequent host request resides within the first ICDA.

5. A data storage cluster according to claim 1, wherein the host request is a first host request and the target disk is a first target disk, and wherein:

the second ICDA includes one or more host interfaces at which host data storage requests are received, the second ICDA being operative to (i) determine whether a second target disk for a second received host request resides within the first ICDA, (ii) if the second target disk resides within the first ICDA, forward the second host request via the cluster interconnection network to the first ICDA for servicing, and (iii) upon receiving an indication from the first ICDA that the second request has been serviced, return an indication to the requesting host that the request has been serviced; and the first ICDA includes one or more disk interfaces respectively interfacing to disks within the first ICDA, the first ICDA being operative to (i) receive the second host request from the second ICDA via the cluster interconnection network, (ii) service the received second host request via the disk interface coupled to the target disk, and (iii) return an indication to the second ICDA that the second host request has been serviced.

6. A storage system according to claim 1, wherein each ICDA includes an internal connection fabric having a plurality of ports for coupling to respective functional elements in the ICDA, each port having substantially the same interface characteristics as the other ports to provide flexibility in the assigning of different types of functional elements to the various ports, the different types of functional elements including host interfaces of the type contained in the first ICDA, disk interfaces of the type contained in the second ICDA, and memory modules used to store data associated with host requests.

7. A storage system according to claim 1, wherein each ICDA further comprises a switch network operative to provide dynamic connections between different functional elements within the ICDA, the functional elements including the host interfaces in the first ICDA and the disk interfaces in the second ICDA.

8. A storage system according to claim 7, wherein the functional elements in the first ICDA further include memory modules forming part of a memory used to store data associated with host requests.

9. A storage cluster according to claim 1, wherein the cluster interconnection network has a ring topology.

10. A storage cluster according to claim 1, wherein the cluster interconnection network has a hub-and-spoke topology and includes a central switch serving as the hub.

11. A storage cluster according to claim 1, wherein the ICDAs of the cluster are disposed in separate physical enclosures.

12. A storage cluster according to claim 1, wherein at least some of the ICDAs are disposed in a single physical enclosure.

13. A storage cluster according to claim 1, wherein all of the ICDAs are disposed in a single physical enclosure.

* * * * *